(12) United States Patent
Caldwell (10) Patent No.: US 11,270,344 B2
(45) Date of Patent: Mar. 8, 2022

(54) CONTENT PRESENTATION BASED ON LOCATION (71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 45 days.

(21) Appl. No.: 16/399,680

(22) Filed: Apr. 30, 2019

(65) Prior Publication Data
US 2019/0259062 A1 Aug. 22, 2019

Related U.S. Application Data (63) Continuation of application No. 14/936,677, filed on Nov. 9, 2015, now Pat. No. 10,740,792, which is a continuation-in-part of application No. 13/986,529, filed on May 13, 2013, now abandoned.

(51) Int. Cl.
G06Q 30/02 (2012.01)
(52) U.S. Cl.
CPC ..... *G06Q 30/0255* (2013.01); *G06Q 30/0261* (2013.01); *G06Q 30/0269* (2013.01)
(58) Field of Classification Search
None
See application file for complete search history.

(56) References Cited

U.S. PATENT DOCUMENTS 7,797,231 B1 * 9/2010 Loeb ..................... G06Q 40/025
705/38
9,633,378 B1 4/2017 Nath et al.
2002/0178354 A1 11/2002 Ogg et al.
2003/0233328 A1 12/2003 Scott et al.
2005/0187866 A1 8/2005 Lee
2006/0229946 A1 10/2006 Scroggie et al.
2009/0216591 A1 * 8/2009 Buerger ............. G06Q 30/0201
705/7.29
2009/0271275 A1 10/2009 Regmi et al.
2009/0307072 A1 12/2009 Morales-lema
(Continued)

FOREIGN PATENT DOCUMENTS

CA 2874981 A1 * 12/2013 ............. G06Q 30/06
RU 2509362 C2 3/2014
WO WO-0125997 A2 * 4/2001 ............. G06Q 40/02

OTHER PUBLICATIONS

U.S. Appl. No. 14/936,677 Office Action, dated Dec. 2, 2019, pp. 1-16.
(Continued)

*Primary Examiner* — Marie P Brady
(74) *Attorney, Agent, or Firm* — Kunzler Bean & Adamson, PC (57) ABSTRACT Apparatuses, system, methods, and computer program products are presented for presenting content based on location. A location module monitors location data from one or more sensors of a hardware device for a user relative to a plurality of target locations. A target location is associated with one or more items for sale. A selection module selects an offer to finance an item for sale for a user based at least in part on financial transaction data for the user. An offer module dynamically provides an offer to a user in response to monitored location data from one or more sensors satisfying a target location.

18 Claims, 6 Drawing Sheets

(56) References Cited

U.S. PATENT DOCUMENTS

| | | | |
|---|---|---|---|
| 2010/0100470 A1 | 4/2010 | Buchanan et al. | |
| 2011/0131096 A1 | 6/2011 | Frew et al. | |
| 2011/0191166 A1 | 8/2011 | Joa et al. | |
| 2011/0191177 A1 | 8/2011 | Blackhurst et al. | |
| 2011/0246281 A1* | 10/2011 | Satyavolu | G06Q 30/0255 705/14.25 |
| 2012/0185311 A1 | 7/2012 | Tavares et al. | |
| 2012/0323656 A1* | 12/2012 | Leach | G06Q 30/0239 705/14.17 |
| 2013/0054367 A1 | 2/2013 | Grigg et al. | |
| 2013/0117173 A1* | 5/2013 | Schwarz | G06Q 40/025 705/38 |
| 2013/0211916 A1* | 8/2013 | Putman | G06Q 30/02 705/14.58 |
| 2013/0262290 A1* | 10/2013 | Hanson | H04W 4/029 705/38 |
| 2013/0297412 A1* | 11/2013 | Batra | G06F 16/00 705/14.49 |
| 2014/0081751 A1* | 3/2014 | Hogan | G06Q 40/025 705/14.53 |
| 2014/0136381 A1* | 5/2014 | Joseph | G06Q 40/02 705/35 |
| 2014/0172687 A1* | 6/2014 | Chirehdast | G06Q 40/00 705/38 |
| 2014/0180808 A1 | 6/2014 | Boal | |
| 2014/0207571 A1* | 7/2014 | Hammock | G06Q 30/0255 705/14.53 |
| 2014/0257978 A1* | 9/2014 | Bills | G06Q 30/0255 705/14.53 |
| 2014/0365301 A1 | 12/2014 | Rappoport et al. | |
| 2015/0302424 A1 | 10/2015 | Akbarpour et al. | |

OTHER PUBLICATIONS

U.S. Appl. No. 14/936,677 Notice of Allowance, dated Apr. 6, 2020, pp. 1-23.

U.S. Appl. No. 14/936,677 Decision on Appeal dated Sep. 9, 2019.

U.S. Appl. No. 16/945,547 Office Action, dated Nov. 29, 2021.

* cited by examiner

CONTENT PRESENTATION BASED ON LOCATION

CROSS-REFERENCES TO RELATED APPLICATIONS

This is a continuation of and claims priority to U.S. patent application Ser. No. 14/936,677 entitled "CONTENT PRESENTATION BASED ON LOCATION" and filed on Nov. 9, 2015, for John Ryan Caldwell, which is a continuation-in-part application of and claims priority to U.S. patent application Ser. No. 13/986,529 entitled "METHOD AND SYSTEM FOR PROVIDING INDIVIDUALLY-TAILORED ADVERTISING ANALYSIS AND MOTIVATION BASED ON A USER'S PERSONAL FINANCIAL MANAGEMENT DATA" and filed on May 13, 2013, for John Ryan Caldwell, both of which are incorporated herein by reference in their entirety for all purposes.

FIELD

This invention relates to content presentation and more particularly relates to determining content to present to a user based on location data for the user.

BACKGROUND

Users are constantly presented with various content intended to persuade, entertain, advertise, or the like. For example, users may be presented with content on their smart phones, tablet computers, televisions, game consoles, or the like. Even though many users may see the content, the users may not be the most likely target audience for the content. In other words, content providers may want their content to be consumed by an audience that will most likely be affected by the content (e.g., purchase advertised goods and/or services). However, determining what content to provide and how and when to effectively provide the content to a particular target audience may be a difficult task.

SUMMARY

Apparatuses for presenting content based on location are disclosed. A location module, in certain embodiments, monitors location data from one or more sensors of a hardware device for a user relative to a plurality of target locations. Each target location of a plurality of locations, in some embodiments, is associated with one or more items for sale. In one embodiment, a selection module selects an offer to finance an item of one or more items for sale for a user based at least in part on financial transaction data for the user. An offer module, in a further embodiment, dynamically provides an offer to a user in response to monitored location data from one or more sensors satisfying one of a plurality of target locations.

Other apparatuses for presenting content based on location are disclosed. In one embodiment, an apparatus includes means for monitoring location data from one or more sensors of a hardware device for a user relative to a plurality of target locations, and each target location is associated with one or more items for sale. An apparatus, in some embodiments, includes means for selecting an offer to finance an item of one or more items for sale for a user based at least in part on financial transaction data for the user. In one embodiment, an apparatus includes means for dynamically providing an offer to a user in response to monitored location data from one or more sensors satisfying a target location of a plurality of target locations.

Methods for presenting content based on location are disclosed. A method, in one embodiment, includes monitoring location data from one or more sensors of a hardware device for a user relative to a plurality of target locations, where each target location is associated with one or more items for sale. In some embodiments, a method includes selecting an offer to finance an item of the one or more items for sale for a user based at least in part on financial transaction data for the user. A method, in certain embodiments, includes dynamically providing an offer to a user in response to monitored location data from one or more sensors satisfying one of a plurality of target locations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
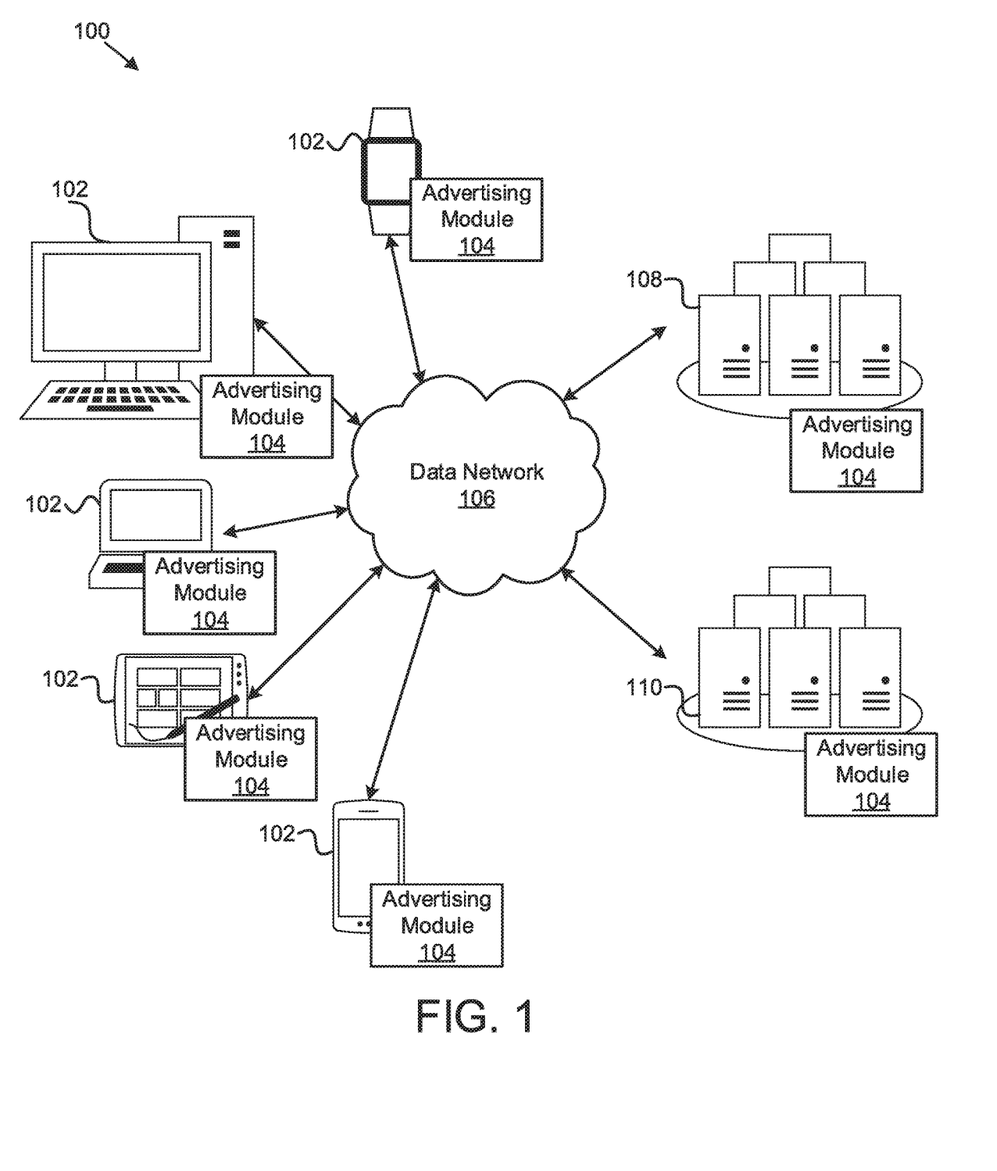
FIG. 1 is a schematic block diagram illustrating one embodiment of a system for presenting content based on transaction history.

FIG. 1 depicts one embodiment of a system 100 for presenting content based on transaction history. In one embodiment, the system 100 includes one or more information handling devices 102, one or more advertising modules 104, one or more data networks 106, one or more third party systems 108, and/or one or more backend systems 110. In certain embodiments, even though a specific number of information handling devices 102, advertising modules 104, data networks 106, third party systems 108, and backend systems 110 are depicted in FIG. 1, one of skill in the art will recognize, in light of this disclosure, that any number of information handling devices 102, advertising modules 104, data networks 106, third party systems 108, and backend systems 110 may be included in the system 100 for presenting content based on transaction history.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a third party system 108 and/or a backend system 110 via a data network 106, described below. The information handling devices 102, in a further embodiment, are capable of executing various programs, program code, applications, instructions, functions, or the like.

The advertising module 104, in certain embodiments, leverages a user's financial transaction data (e.g., aggregated from multiple entities for personal financial management purposes, or the like) to provide dynamic, customized, and/or otherwise relevant content and/or offers to the user. In one embodiment, the advertising module 104 is configured to select a user for an offer in response to the user's financial transaction data satisfying a transaction metric associated with the offer. In a further embodiment, the advertising module 104 is configured to determine a target location for the offer based on the user's financial transaction data. In some embodiments, the advertising module 104 is configured to monitor location data from one or more sensors for the user relative to the target location. The advertising module 104, in various embodiments, is configured to dynamically display and/or otherwise provide the offer to the user in response to the monitored location data from the one or more sensors satisfying the target location. In this manner, in certain embodiments, the advertising module 104 may provide content, such as offers or advertisements, to a user which are highly relevant to the user's previous and/or future purchases and which the user is likely to accept or act upon, benefiting both the user and the content provider.

In various embodiments, the advertising module 104 may be embodied as hardware, software, or some combination of hardware and software. In one embodiment, the advertising module 104 may comprise executable program code stored on a non-transitory computer readable storage medium for execution on a processor of an information handling device 102, a device of the third party system 108, the backend system 110, or the like. For example, the advertising module 104 may be embodied as executable program code executing on one or more of an information handling device 102, a third party system 108, a backend system 110, a combination of one or more of the foregoing, or the like. In such an embodiment, the various modules that perform the operations of the advertising module 104, as described below, may be located on an information handling device 102, a third party system 108, a backend system 110, a combination of the foregoing, and/or the like.

In various embodiments, the advertising module 104 may be embodied as a hardware appliance that can be installed or deployed in a third party system 108, a backend system 110, on a user's information handling device 102, or elsewhere on the data network 106. In certain embodiments, the advertising module 104 may comprise a hardware device such as a secure hardware dongle or other hardware appliance device (e.g., a set-top box, a network appliance, or the like) that attaches to another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of the advertising module 104 may comprise a power interface, a wired and/or wireless network interface, a graphical interface that attaches to a display, an electronic display, and/or a semiconductor integrated circuit device as described below, configured to perform the functions described herein with regard to the advertising module 104.

The advertising module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the advertising module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the advertising module 104.

The semiconductor integrated circuit device or other hardware appliance of the advertising module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the advertising module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The third party system 108, in one embodiment, includes a network accessible computing system such as one or more web servers hosting one or more web sites, an enterprise intranet system, an application server, an application programming interface (API) server, an authentication server, or the like. The third party system 108 may include systems that provide marketing content related to various institutions or organizations. For example, the third party system 108 may include a system providing marketing content for a retailer, an online store, a manufacturer, a financial institution, a university, a government agency, or the like. The marketing content may include digital content such as advertisements, promotions, coupons, vouchers, and/or the like.

In one embodiment, the backend system 110 facilitates selecting offers for a user and providing the offers to the user. The backend system 110, for example, may be associated with a personal financial management (PFM) provider that tracks a user's financial transactions, financial goals and/or budgets, financial contracts, and/or the like. The backend system 110 may include one or more servers located remotely to the information handling devices 102 and/or the third party systems 108. The backend system 110 may include at least a portion of the modules of the advertising module 104 (e.g., one or more of the sub-modules described below with regard to FIG. 2 and FIG. 3), may comprise hardware of the advertising module 104, may store executable program code of the advertising module 104 in one or more non-transitory computer readable storage media, and/or may otherwise perform one or more of the various operations of the advertising module 104 described herein in order to authenticate and match an unknown user to his/her user data via a secure third party system 108.

Figure 2:
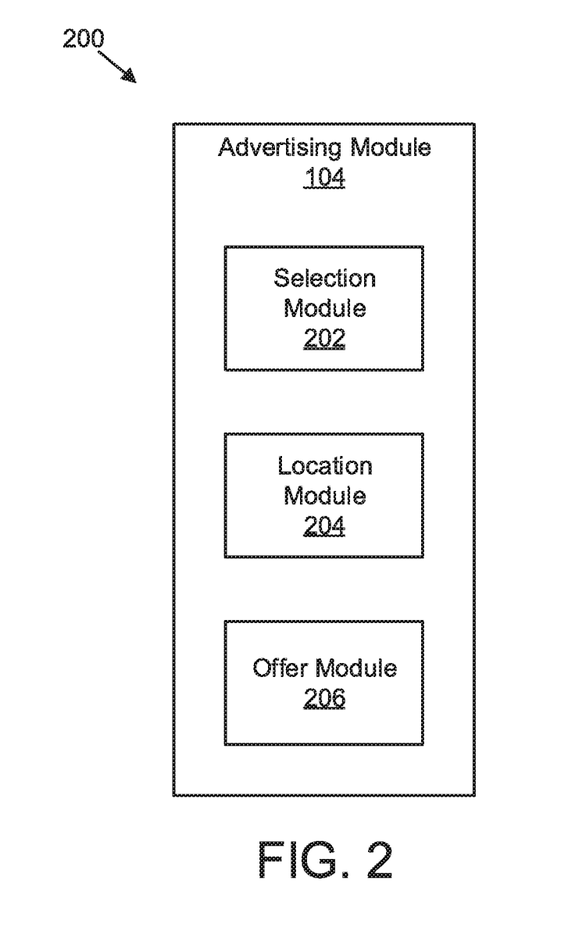
FIG. 2 is a schematic block diagram of one embodiment of a module for presenting content based on transaction history.

FIG. 2 depicts one embodiment of a module 200 for presenting content based on transaction history. In one embodiment, the module 200 includes an embodiment of an advertising module 104. In certain embodiments, the advertising module 104 includes one or more of a selection module 202, a location module 204, and an offer module 206, which are described in more detail below.

In one embodiment, the selection module 202 is configured to select a user for an offer in response to the user's financial transaction data satisfying a transaction metric associated with the offer. The user, in certain embodiments, includes an individual, a company or a company representative, or the like, that has opted-in to have his/her financial transactions recorded and/or aggregated. For example, a user may opt-in, subscribe, or be a member of a PFM provider that is setup to track, monitor, record, log, or the like, financial transactions, contact information, and other personal and/or identification information of the user, aggregate such information from one or more third party sources (e.g., financial institutions such as banks, credit unions, credit card companies or other lenders, payment processing companies, online payment providers; third party aggregators which gather transaction data from financial institutions; and/or the like). In some embodiments, the PFM stores the user's financial transaction data and identification data identifying the user securely (e.g., in a secure database or other non-volatile storage) such that the data is unavailable to unauthorized users.

The financial transaction data, in one embodiment, includes data associated with different types of financial transactions for the user. Financial transactions may include financial contracts, such as mortgages, auto loans, student loans, and/or the like, cell-phone contracts, internet contracts, television contracts, utility contracts, and/or other obligations where regular, periodic payments are made according to a payment schedule. Financial transactions may also include purchases, such as retail purchases, online purchases, grocery purchases, home improvement purchases, gas purchases, and/or the like. In certain embodiments, the financial transaction data may include data for individual items that the user purchased, such as an identifier for the item (e.g., the item's stock keeping unit (SKU) identifier, universal product code (UPC), international article number (EAN), global trade item number (GTIN), and/or the like), the purchase price, the date of purchase, the location of purchase, and/or other details of an item purchased in a transaction. A transaction, in one embodiment, may include the purchase of multiple items. Thus, in one example, when a user makes a mortgage payment or goes grocery shopping, information describing the mortgage payment, such as amount, interest rate, date of payment, amount for interest, amount for principle, or the like; or the grocery purchases, such as a total amount spent, location of grocery store, information for individual items purchased, date of purchase, or the like; may be monitored and recorded by a PFM.

In certain embodiments, an offer selected for a user includes one or more advertisements, coupons, promotions, discounts, or other marketing materials. The offer may be related to a particular entity, such as a vendor, a merchant, a service provider, a retailer, a manufacturer, an online store, or the like. For example, the offer may be a discount available for purchases made at Wal-Mart®. In a further embodiment, the offer may be related to a particular product or service. For example, the offer may be a buy-one-get-one free promotion available on Coke® products. In one embodiment, the offer is related to a financial contract, such as a mortgage, auto loan, student loan, cell phone plan, or the like. For example, the offer may be a promotion for a lower mortgage interest rate if the user refinances his mortgage using the company providing the promotion. The offer, in some embodiments, may be available to a user in response to the user making a purchase; subscribing to a service; providing information, via a survey, quiz, poll, or the like; signing-up to be a member of a program, such as a loyalty program; providing contact information; and/or fulfilling another offer.

In some embodiments, the selection module 202 selects a user for an offer based on the user's financial transaction data. For example, the selection module 202 may select user A for a discount offer on home improvement products based on a recent purchase at The Home Depot®, and may select user B for an offer to refinance a mortgage based on a recent mortgage payment. In one embodiment, the selection module 202 selects a user for an offer in response to the user's financial transaction data satisfying a transaction metric associated with the offer. As used herein, a transaction metric may include a measurable or estimable quantity or unit of a financial transaction and/or series of transactions that can be used to select an offer for a user. A transaction metric may include an interest rate, a sum total spent on various types of items, a price, an interest rate, a monthly payment amount, a fee, a vehicle ownership metric, a geographical spending metric, a housing cost metric, a food spending metric, an entertainment spending metric, an income metric, a savings metric, a consistency metric, a competitor metric, a lifetime value metric, a total spend metric, a transaction interval metric, and/or the like.

A vehicle ownership metric, in various embodiments, may indicate, based on a user's financial transaction data, whether a user owns a vehicle, a value of a user's vehicle, a make and/or model of a user's vehicle, a model year of a user's vehicle, an amount of time a user has owned a vehicle, a number of miles of a user's vehicle, an amount spent on fuel for a user's vehicle; a date of a last maintenance of a user's vehicle; a cost of a last maintenance of a user's vehicle; a total cost of maintenance of a user's vehicle; an average cost (e.g., per month, per year) of maintenance on and/or of total ownership of a user's vehicle; a monthly loan payment amount for a user's vehicle; an original amount and/or an outstanding balance of a loan for a user's vehicle; and/or another vehicle ownership metric determined and/or inferred from a user's financial transaction data.

A geographical spending metric, in various embodiments, may indicate, based on a user's financial transaction data, a user's overall spending in one or more geographic regions, a user's categorized spending in one or more geographical regions, or the like. A geographic region, in certain embodiments, may comprise a street, a development, a district, a city, a county, a state, and/or another identifiable area. A geographical spending metric, in one embodiment, may be categorized by transaction type, with one or more categories and/or subcategories, such as home, auto, travel, financial, entertainment, medical, food, restaurant, grocery, and/or the like.

A housing cost metric, in various embodiments, may indicate, based on a user's financial transaction data, whether a user owns a residence, whether a user rents/leases a residence, a user's housing costs, a location of a user's residence, a mortgage interest rate for a user's residence, a mortgage balance for a user's residence, an original mortgage amount for a user's residence, a home owner's insurance payment amount for a user, a property tax amount for a user's residence, and/or the like.

A food spending metric, in various embodiments, may indicate, based on a user's financial transaction data, an overall amount a user spends on food, an amount a user spends on groceries, an amount a user spends on restaurants, an amount a user spends on food from a particular entity and/or location, or the like. A food spending metric may have various time scales, such as per breakfast, per lunch, per dinner, per meal, daily, weekly, monthly, yearly, over a lifetime of the user's financial transaction data, and/or the like.

A transaction metric, in one embodiment, may comprise an income metric indicating a user's income (e.g., monthly, yearly, by source, gross income, disposable income, and/or the like). In a further embodiment, a transaction metric may comprise a savings metric indicating an amount of money a user saves (e.g., balance of a savings account; balance of an investment account; aggregated total of several savings and/or investment accounts; total amount saved; amount saved over a time period such as daily, weekly, monthly, and/or yearly; a rate of saving; and/or the like).

A transaction metric, in one embodiment, comprises a consistency metric indicating an amount of variation in spending of a user (e.g., variation in total spending over one or more time periods, variation in spending by category over one or more time periods, and/or the like). For example, in one embodiment, an offer provider or advertiser may target a user with consistent spending, for an offer, in an effort to gain a consistent, loyal customer, or the like. In a further embodiment, an offer provider or advertiser may target a user with inconsistent spending (e.g., wide variations in spending week to week and/or month to month), believing that a user with inconsistent spending may be more likely to make an impulse purchase, and/or the like.

A competitor metric, in various embodiments, may indicate an amount a user spends at one or more specific competitors of a provider of an offer, a frequency of transactions a user makes at a competitor of a provider of an offer, one or more identities of competitors of a provider of an offer with which a user has transacted, or the like. In one embodiment, a provider of an offer may identify one or more competitors to the selection module 202. In a further embodiment, the selection module 202 may automatically determine one or more competitors for a provider of an offer based on a transaction category of the provider and/or the offer.

A transaction metric, in one embodiment, comprises a lifetime value metric indicating a projected total value of a user to a provider of an offer as a customer, an amount of time until a provider of an offer is projected to break even on the offer with a user as a customer (e.g., based on the user's financial transaction data and on a cost of the offer to the provider), and/or the like. For example, the selection module 202 may determine and/or estimate, based on a user's financial transaction data, an amount the user is likely to spend on goods and/or services provided by a provider of an offer, how loyal a user is likely to be to a provider of an offer, and/or the like, and may determine a lifetime value metric based on one or more of the foregoing determinations.

A transaction metric, in certain embodiments, comprises a total spend metric indicating a confidence of whether a user's financial transaction data (e.g., aggregated by a PFM as described above) includes each of the user's financial transactions, aggregated from multiple entities (e.g., banks, credit unions, credit card companies or other lenders, payment processing companies, online payment providers, and/or the like). If there is a low confidence or probability that the selection module 202 has access to each of the user's financial transactions (e.g., a complete and/or substantially complete financial snapshot for the user), it may be unlikely that the selection module 202's determination of whether the user's financial transaction data satisfies a transaction metric associated with an offer is accurate, and a provider of an offer may therefore find the user a poor candidate for the offer, due to the uncertainty of whether the user's financial transaction data is complete. Conversely, if there is a high confidence or probability that the selection module 202 has access to each of a user's financial transactions (e.g., a complete and/or substantially complete financial snapshot for the user), a provider of an offer may have greater trust in the selection module 202's selection of the user, and may provide the offer to the user with greater certainty.

The selection module 202, in certain embodiments, may analyze and/or process a user's financial transaction data using one or more rules, flags, indicators, and/or the like, to determine a total spend metric indicating a confidence of whether the user's financial transaction data includes each of the user's financial transactions (e.g., over a predefined period). For example, in one embodiment, the selection module 202 may start at a default confidence level (e.g., 50%, 0.5, 0%, 0, 100%, 1, or the like) and may adjust the confidence level for a user's financial transaction data based on one or more confidence factors. The selection module 202, in certain embodiments, may decrease a confidence level if one transaction type in a transaction type pair (e.g., two types of transactions that are often seen together within a predefined period) is missing, may increase a confidence level if both transaction types in a transaction type pair are present, or the like. For example, a transaction type pair may include a mortgage payment and a utility payment; a payment credit on a credit card statement and a corresponding debit from a bank account; a car payment and fuel purchases; and/or another transaction type pair.

In a further embodiment, the selection module 202 may increase a confidence level of a total spend metric if one or more predefined key transactions are present, and/or may decrease a confidence level of a total spend metric if one or more predefined key transactions are not present in the financial transaction data of a user. A key transaction, in one embodiment, comprises a transaction that is expected to occur for each user within a predefined period. For example, a key transaction may comprise a direct deposit and/or payroll check deposit, a mortgage and/or rent payment, at least a threshold amount spent on a personal necessity (e.g., food), and/or another expected transaction. In certain embodiments, the selection module 202 may be configured to prompt a user to add one or more additional accounts in response to determining a confidence level below a threshold for a total spend metric for the user. In another embodiment, the selection module 202 may query a user whether the user's financial transaction data includes each of the user's financial transactions, and may base a confidence level of a total spend metric on the user's answer.

The selection module 202, in one embodiment, may determine a confidence level of a total spend metric and/or another transaction metric by processing users' financial transaction data using one or more predefined rules, or the like. In a further embodiment, the selection module 202 may determine a confidence level of a total spend metric and/or another transaction metric dynamically, using machine learning or other artificial intelligence, or the like, causing an accuracy of the selection module 202's determinations to increase over time (e.g., at least up to a point) as the selection module 202 learns from and detects patterns in the financial transaction data.

A transaction metric, in certain embodiments, may comprise a transaction interval metric indicating an amount of time spanned by a user's financial transaction data (e.g., one month, two months, three months, six months, a year, two years, three years, and/or the like). For example, in one embodiment, a provider of an offer for a long term or large purchase, that is not an impulse purchase, may prefer to present the offer to one or more users with a higher transaction interval metric (e.g., with a longer amount of time spanned by the users' financial transaction data), while a provider of an offer for a smaller purchase, such as an impulse purchase, may not have such a preference and my provide its offer to users with a lower transaction interval metric (e.g., with a shorter amount of time spanned by the users' financial transaction data).

In certain embodiments, the selection module 202 may provide an interface (e.g., a graphical user interface (GUI), an application programming interface (API), a command line interface (CLI), and/or the like) for a provider to set one or more thresholds whereby a user's financial transaction data may satisfy a transaction metric for an offer from the provider. By setting one or more thresholds whereby a user's financial transaction data may satisfy a transaction metric, a provider of an offer may target certain users for the offer based on the users' financial transaction history. For example, a provider of an offer may define a transaction metric (e.g., one or more thresholds of a transaction metric) requiring that users who receive the offer own a vehicle, spend at least a selected percentage of the user's income in a selected geographical region, earn at least a selected amount per year, have at least six months of financial transaction data available to the selection module 202, have spent at least a selected amount at one of two of the provider's competitors, and have at least a 75% confidence level that the user's financial transaction data includes all of the user's financial transactions. The selection module 202, in one embodiment, may allow a provider of an offer to select a cap and/or a minimum on a number of users that will receive the offer, to adjust one or more thresholds of a transaction metric until at least a minimum number of users are selected, and/or the like. In this manner, in certain embodiments, a provider of an offer may target the offer to users most likely to benefit from and/or accept the offer, based on the users' own financial transaction data, aggregated from multiple sources.

In a further embodiment, the selection module 202 may use a transaction metric to compare one or more available offers for a user to determine a benefit of the offers to the user based on the user's financial transaction data. For example, the selection module 202 may select a user to receive an offer for an auto loan with a lower interest rate than the user's current auto loan interest rate, determined based on the user's financial transaction data, which may save the user money on their loan payment each month. Similarly, in another example, the selection module 202 may select the user to receive an offer to switch to a different mortgage company offering mortgage rates of 3.5% based on user's current mortgage interest rate of 4.0%. Other offers may include potential benefits such as lower interest rates, lower fees, higher investment rates, shorter payment schedules, discounts, promotions, coupons, an early loan payoff, a balance transfer, or the like.

In some embodiments, the available offers may be posted or otherwise made available by a third party system 108 of an advertiser, promoter, or the like (e.g., a provider of an offer). If there are multiple offers available to a user, the selection module 202 may select the best offer for the user. The best offer may be the offer that provides the greatest benefit to the user in terms of a discount, monthly payment, interest rate, or the like, in terms of the user's financial goals, as described below, and/or the like. In a further embodiment, the selection module 202 may present a plurality of the multiple offers available to the user so that the user may choose to accept one or more of the available offers.

In some embodiments, the selection module 202 selects a user for an offer based on the user's purchase history, determined from the user's financial transaction data. For example, the selection module 202 may determine that the user spends at least $100 a month on home improvement goods. Accordingly, the selection module 202 may select the user for offers providing discounts, promotions, coupons, or the like, on home improvement items. Similarly, the selection module 202 may select the user for offers providing discounts, promotions, coupons, or the like on home improvement items from a particular home improvement retailer, vendor, store, or the like, such as the Home Depot®, Lowe's®, or the like.

In one embodiment, the selection module 202 selects a user for an offer based on one or more financial transactions of other users (e.g., one or more other users which the selection module 202 determines have similar interests and/or purchasing habits, based on the users' financial transaction data). The selection module 202 may select a user for an offer associated with a transaction that is present in the financial transaction data for the one or more other users (e.g., with similar interests and/or spending habits) but not yet present in the selected user's financial transaction data, acting as a recommendation engine allowing the selected user to discover something new that other similar users already enjoy. For example, the selection module 202, based on a user's financial transaction data, may determine that a user purchases certain items regularly on Amazon.com®. The selection module 202 may also determine that one or more other users have recently purchased similar items at Amazon.com® or at another retailer based on their financial transaction data. Accordingly, the selection module 202 may select the user to receive an offer for the items that the other users have purchased based on the other users' financial transaction data (e.g., the offer may include a message such as "Users like you have recently purchased these products from these retailers. Buy now and save 5%," or the like).

In a further embodiment, the selection module 202 selects a user for an offer based on the user's search history, which may be stored along with the user's financial transaction data (e.g., on a mobile device 102, or another information handling device 102 of a user). For example, the selection module 202 may determine that the user has searched for new vehicles over the past week, and, based on the search history data, may select the user to receive one or more offers from various new and/or used car dealers, banks offering deals for auto loans, deals from car insurance companies, and/or the like. In certain embodiments, the selection module 202 may select a category for an offer based on a user's search history, and may select the user for a specific offer within the category based on the user's financial transaction data, as described above. In one embodiment, the selection module 202 may select a user for an offer in response to both the user's search history data satisfying a search metric associated with the offer (e.g., the user has searched for a selected term within a selected time period) and the user's financial transaction data satisfying a transaction metric, as described above.

In certain embodiments, the offer may comprise an offer that the offer provider has paid to have a priority over one or more other offer that were not paid, and/or that paid less. For example, the selection module 202 may select a user for a car insurance offer. The car insurance offer may be an offer paid for by a car insurance company such that the offer may have a higher priority than one or more different offers that were not paid for by other car insurance companies, or for which the other car insurance companies paid less.

In one embodiment, the selection module 202 selects a user for an offer based on the user's schedule, which may be stored along with the user's financial transaction data (e.g., on a mobile device 102, or another information handling device 102 of a user). In certain embodiments, the user's schedule is determined from a calendar associated with the user, location information associated with the user, or the like. For example, the selection module 202 may determine that the user drives past a McDonald's® or other restaurant every evening on his way home from work, based on GPS data or other location data for the user. Accordingly, the selection module 202 may select the user to receive a coupon redeemable at the McDonald's®. The selection module 202, in some embodiments, selects the user to receive offers associated with holidays, birthdays, vacations, or other events as determined from the user's schedule.

In one embodiment, the location module 204 is configured to determine a target location and/or a target time for presenting an offer to a user based on the user's financial transaction data. A target location, in various embodiments, may comprise a location where an offer is most likely to be accepted by a user, most likely to be noticed by a user, most likely to be usable by a user, and/or the like. In one embodiment, the location module 204 may select a target location where the offer is redeemable and/or may otherwise be used, such as a location associated with a provider of the offer, so that the user receives the offer when the user is at or near (e.g., within a selected distance) the location where the offer may be accepted and used. Such an offer and/or target location may comprise "complimentary spend" based on a user's financial transaction data (e.g., a purchase at a location that a user already frequents, but for a good and/or service the user has not previously purchased).

For example, as described above, the selection module 202 may select an offer for a good and/or service identified in a user's financial transaction data at a competitor of a provider. However, if the user already frequents the provider, but for a different good and/or service, the location module 204 may select a location associated with the provider as a target location for an offer for the food and/or service previously purchased from the competitor, may select a location associated with the competitor as a target location for the offer, or both. For example, if a user typically purchases a roast beef sandwich from Arby's® on Wednesdays and purchases a chicken sandwich from McDonald's® on Fridays, the location module 204 may select Fridays just before lunch as a target time for an offer for an Arby's® chicken sandwich, may select McDonald's® or being en route to McDonald's® as a target location for an offer for an Arby's® chicken sandwich, and/or the like. As described above, in certain embodiments, the selection module 202 may process financial transaction data identifying specific items a user has purchased (e.g., the item's name, SKU, UPC, EAN, GTIN, and/or the like) in order to provide more accurate product-level targeting. In another example, the location module 204 may determine that a user is about to finish a meal, has finished a meal without ordering a dessert, or the like and may select the user's time and location as a target time and location for an offer for a dessert item and/or location within a selected distance (e.g., a dessert item and/or location which the user has not tried before, based on the user's financial transaction data). By monitoring the user's location data in real time, in certain embodiments, the location module 204 may allow offers to be dynamically targeted and provided to a user at optimal locations and/or times, based on the user's own financial transaction data and location data.

In one embodiment, the location module 204 may select a competitor of a provider of an offer as a target location for presenting the offer, because the user is likely to be purchasing goods and/or services also available from the provider, and the user's financial transaction data may indicate that the user has purchased from the competitor with at least a selected frequency in the past, and/or the like. In a further embodiment, the location module 204 may select as a target location a place where the user has at least a selected likelihood of being on route to a competitor of the provider of the offer, as the user may be more likely to re-route to the provider's location while further away from the competitor (e.g., such that the offer is presented to the user as early as possible, with at least a selected level of certainty that the user is en route to a competitor's location). Accordingly, in certain embodiments, a target location may comprise and/or be associated with a target time (e.g., absolute, relative) determined by the location module 204, selected by a provider, or the like.

For example, in one embodiment, the location module 204 may determine, based on location data and/or on a user's financial transaction data, that the user has a 90% chance of being on route to a selected competitor when traveling in a certain direction on a certain road at a certain time on a certain day, and the location module 204 may select the certain direction on the certain road at the certain time on the certain day as the target location. In one embodiment, a provider of an offer may provide one or more parameters for a target location to the target module 204, such as a threshold likelihood that the user is en route to a competitor, an identity of a competitor, a geographic region for a target location, and/or the like.

In certain embodiments, the location module 204 may determine a target location based on one or more offers available to a user based on the user's financial transaction data. In some embodiments, a target location comprises a physical location, such as a brick-and-mortar store, a mall, an airport, a restaurant, or the like. In certain embodiments, a target location comprises an online location, such as a website, a chat room, a social media network, or the like. In various embodiments, a target location comprises a location associated with a competitor of a provider of an offer (e.g., the company, organization, entity, or the like that provides the offer).

In certain embodiments, the location module 204 is configured to monitor location data from one or more sensors for a user relative to a target location, in embodiments where the target location comprises a physical location (e.g., to determine when the user has arrived at a target location, when the user is approaching a target location, when the user has arrived within a selected distance of the target location, or the like). The one or more sensors may include GPS sensors, proximity sensors, wireless beacons, network adapters, and/or other sensors configured to determine location data for a user. The one or more sensors may comprise part of an information handling device 102 of the user, such as a smart phone, tablet computer, laptop computer, smart watch, or the like. In a further embodiment, a sensor may comprise a beacon in communication with the user's information handling device 102 such that when the user comes within a communication proximity of the beacon, the beacon sends the location data of the beacon and/or the user's information handling device 102 to the location module 204.

In various embodiments, the location module 204 monitors for location data by polling the sensors at periodic intervals for location data. In a further embodiment, the location module 204 monitors for location data by listening for location data sent from the sensors. In certain embodiments, the location module 204 monitors for the user's online location data by monitoring a user's browsing history (e.g., using cookies, or the like, to monitor, log, and track a user's browsing activities).

In some embodiments, at least a portion of the location module 204 may be located on a user's information handling device 102, may be communicatively coupled to a sensor, a beacon, or the like, and may determine location data for the user's device 102. In such an embodiment, the location module 204 provides the location data to a PFM provider of the user (e.g., another portion of the location module 204, the offer module 206, or the like), where it may be subsequently used to determine one or more offers to present to the user based on the location data relative to a target location for the one or more offers.

The offer module 206, in one embodiment, is configured to dynamically provide an offer to a user in response to monitored location data from the one or more sensors of the location module 204 satisfying the target location. In some embodiments, the location data satisfies the target location by being within a predetermined proximity of the target location, approaching the target location, or the like. For example, if the target location comprises a restaurant, the offer module 206 may determine that the location data satisfies the target location when the user is within five miles of the restaurant. In some embodiments, online location data may satisfy an online target location when a user visits a particular website, social network, or the like.

In certain embodiments, the offer module 206 dynamically provides the offer to the user by sending an electronic message, such as an email, a text, an instant message, a push notification, or the like when the location data indicates that the user, and/or an information handling device 102 of the user, is at a location that satisfies the target location. In an online embodiment, the offer module 206 may dynamically provide an offer to a user by generating a pop-up window, presenting a banner-ad, displaying a mobile ad, or the like.

In certain embodiments, the offer module 206 dynamically provides an offer to a user when the user reaches a communication proximity to a beacon located at a store, retailer, mall, airport, university, restaurant, or another target location. For example, as the user walks into a store, a beacon at the store may detect the user's smart phone 102 is within a proximity of the beacon such that the beacon can communicate with it (e.g., using Bluetooth®, Wi-Fi®, near field communication (NFC), and/or the like). The beacon may send location data to the location module 204, which may then trigger the offer module 206 to dynamically provide an offer for the user to use at the store on the user's smart phone 102 as the user walks into the store in response to the user's location satisfying the target location for the offer.

Similarly, the offer module 206 may dynamically provide an offer to a user at a point in the store. In certain embodiments, a store may have beacons set up in different departments, aisles, or other areas within the store such that when the user walks into an area of the store, a beacon in that area may send the user's location within the store to the location module 204. For example, as a user walks into the plumbing section at a Home Depot®, the beacon for that area of the store may send the user's location data to the location module 204, and the offer module 206 may dynamically provide a coupon for plumbing supplies to the user in response to the user's location satisfying the target location for the coupon.

Figure 3:
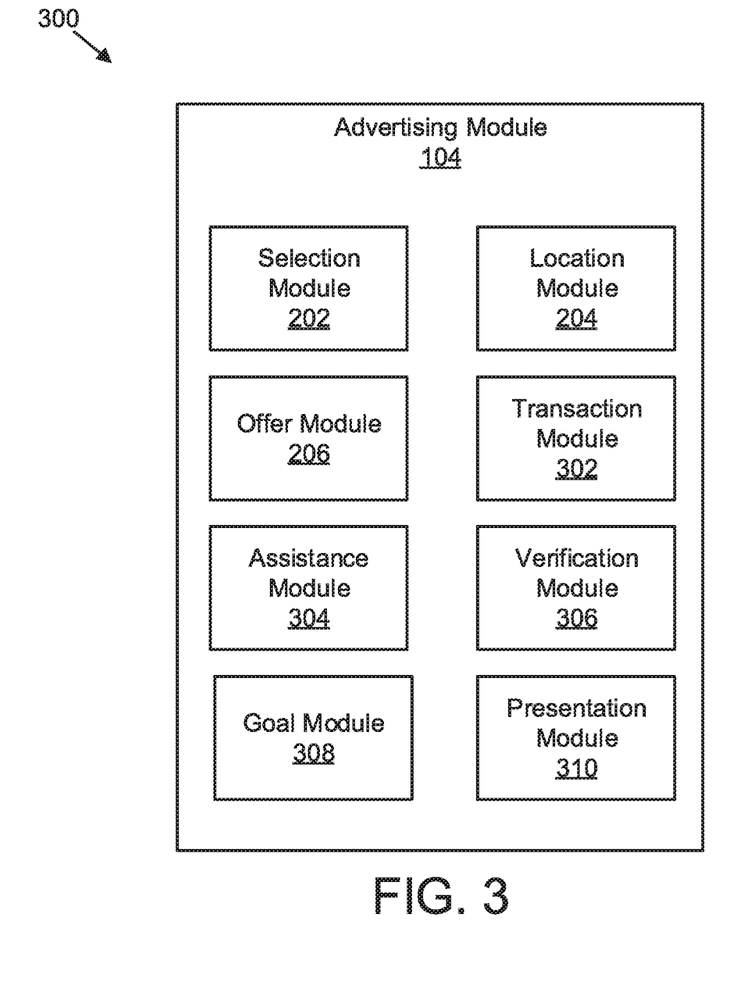
FIG. 3 is a schematic block diagram of an embodiment of another module for presenting content based on transaction history.

In one embodiment, at least a portion of the offer module 206 is located on a user's information handling device 102, and receives an offer for the user in response to the location data that the location module 204 provides satisfying a target location for the offer. The offer module 206 may receive the offer via a data network 106, an email, a text message, an instant message protocol, a social media network, a website, a web browser plug-in, a mobile application, a push notification, an API, and/or the like. In such an embodiment, the presentation module 310, described below, may present the offer that the offer module 206 received on an electronic display of the user's information handling device 102.

FIG. 3 depicts one embodiment of a module 300 for content presentation based on transaction history. The module 300, in one embodiment, includes an embodiment of an advertising module 104. The advertising module 104, in one embodiment, includes one or more of a selection module 202, a location module 204, and an offer module 206, which may be substantially similar to the selection module 202, the location module 204, and the offer module 206 described above with reference to FIG. 2. Furthermore, in certain embodiments, the advertising module 104 includes one or more of a transaction module 302, an assistance module 304, a verification module 306, a goal module 308, and a presentation module 310, which are described in more detail below.

The transaction module 302, in one embodiment, is configured to access a user's financial transaction data to determine whether the user should be selected for the offer. As described above, in certain embodiments, the user's transaction data is stored, managed, maintained, organized, or the like, by a PFM provider. A PFM provider may be an entity that assists a user in the user's personal financial management by providing a single place where the user can view his contact information, identification information, financial information, financial transaction data, financial contract data, loan data, mortgage data, or the like. For example, a PFM provider may be an online server where the user can log in to view his/her financial transaction data and track spending, create financial goals, create budgets, track investments, or the like.

The transaction module 302 may receive a user's authorization to access the user's financial transaction data from a database of the PFM, and allow the transaction module 302 and/or the selection module 202 to determine whether the user should be selected for various offers based on the financial transaction data. Because the user's data is stored securely in a database of the PFM, such as the user's contact data, identification data, and financial transaction data, unauthorized users are unable to view the data unless the user allows them access to the data.

In one embodiment, the transaction module 302 checks the user's financial transaction data for one or more characteristics associated with an offer, such as a particular financial transaction type, a particular item purchased in a financial transaction, a financial transaction that satisfies the transaction metric, a financial transaction that occurred at a particular location, and/or the like in order to determine whether the user should be selected for the offer. For example, the transaction module 302 may check the user's financial transaction data for any purchases made at Costco® within the past 30 days where the user spent more than $150 to determine whether the user should be selected for an offer redeemable online or at a Costco® store.

In one embodiment, the assistance module 304 is configured to electronically assist the user to accept the offer. In certain embodiments, the assistance module 304 electronically assists the user to accept the offer by pre-populating one or more data fields with the user's identification and financial data. For example, the assistance module 304 may prepopulate one or more web forms with the user's information, such as the user's contact information, credit card information, billing information, or the like, in response to the user accepting an offer online.

In certain embodiments, the assistance module 304 accesses the user's identification and financial data from a database of a PFM provider associated with the user in order to facilitate acceptance of the offer. For example, the user may provide credentials to the assistance module 304, such as a username and password, a pass phrase, a PIN number, an access number, or the like, which the assistance module 304 may use to access the user's data securely stored at the user's PFM provider. In this manner, the user does not have to manually enter his contact information and/or billing information, for example, to complete acceptance of the offer, which may increase the likelihood that the user will complete the financial transaction associated with the offer.

The verification module 306, in one embodiment, is configured to verify the user completed a financial transaction associated with the offer based on subsequent financial transaction data received for the user. For example, the verification module 306 may check a user's financial transaction data (e.g., aggregated bank account and/or credit card statements) a month after the user was presented with an offer for a new auto loan to determine whether the user made any payments to the auto loan company associated with the offer, which may indicate that the user switched their current auto loan to the new auto loan company. Similarly, the verification module 306 may check the user's financial transaction data for a purchase at the Home Depot® or another retail location the same day an offer redeemable at the Home Depot® or other retail location is provided to the user to verify the user made a purchase at the Home Depot® or other retail location in response to the provided offer, and/or the like.

In a further embodiment, the verification module 306 verifies the user completed a financial transaction associated with a coupon, promotion, or discount by determining that a financial transaction associated with the offer shows that the coupon, promotion, or discount was used or applied to the purchase price. For example, the verification module 306 may verify that the user bought a product advertised with a 20% discount by determining the 20% discount was applied to a subsequent financial transaction associated with the product. In this manner, the verification module 306 may determine whether an offer was effective as an incentive for the user to purchase the product.

In one embodiment, the verification module 306 determines which of one or more different offers presented to one or more users is more effective. For example, the verification module 306 may perform A/B testing, or a similar statistical experiment, where two or more different offers, versions of an offer, or the like are presented to a user and/or to various users, as selected based on the users' financial transaction data, to determine which offers or versions of an offer are more effective. For example, two different versions of an offer may be identical except for a variation that might effect a user's behavior, such as a different discount amount, a different interest rate, different advertising text, a different image, or the like. In another example, two different offers may be identical except for the method of delivery—one offer may be sent to a user via email while the other offer may be sent via a text message. The verification module 306 may determine an offer's effectiveness according to a transaction amount associated with each offer, which may include a number of users that redeem an offer, a number of offers that were accepted, an amount of money spent associated with an offer, or the like as determined by subsequent financial transaction data for one or more users. Accordingly, the verification module 306 may determine that the more effective offer is the offer associated with the highest transaction size and/or amount.

In a further embodiment, the verification module 306 cooperates with the selection module 202 to allow a provider of an offer to test or sample an offer based on a transaction metric. For example, the selection module 202 may select a sample number of users of a size selected by a provider of an offer and the verification module 306 may verify which users of the sample completed a financial transaction associated with the offer and provide an indication of a percentage of the plurality of users selected as the sample which completed a financial transaction associated with the offer to the provider. If the provider is satisfied with the results from the verification module 306, the provider may run a larger campaign to provide the offer to more users. Otherwise, the provider may change or adjust the offer and run another sample test, or the like.

The goal module 308, in one embodiment, is configured to determine one or more financial goals and/or budgets of the user. The user, for example, may setup various financial goals using a PFM provider's system, such as budgets or spending goals (e.g., grocery budgets, entertainment budgets, gas budgets, and/or the like), debt payoff goals, retirement goals, large purchase goals (e.g., save to purchase a vehicle, home, or other large purchase in a selected amount of time), home improvement goals, and/or the like. The goals may be stored securely with the user's financial transaction data, the user's identification data, and/or the like. In one example, as a user is walking into a Home Depot® the offer module 206 may provide an offer to the user, which the presentation module 310, below, may present to the user, that provides a discount to the user for various home improvement products based on the user's home improvement goal. For instance, the goal module 308 may determine that the user has not reached her predefined budget for home improvement spending for the month. Accordingly, based on the user's financial goal data, the selection module 202 may select the user for home improvement offers, which may be provided to the user in response to location data from one or more sensors indicating the user's location satisfies a target location of an offer.

In certain embodiments, the goal module 308 customizes one or more content elements of an offer based on the user's financial goals. The content elements may include text, graphics, images, animations, videos, audio tracks, or the like. Continuing with the previous example, the goal module 308 may customize the text of the home improvement offer to reflect the user's budget for home improvement goods. For instance, the offer text may recite "It's almost the end of the month, and you haven't reached your home improvement monthly budget of $100. Here is a 20% discount coupon good on home improvement products at The Home Depot®."

In one embodiment, the presentation module 310 is configured to present the offer to the user on an electronic display associated with the user. The electronic display may comprise a display of an information handling device 102, a digital billboard, a digital in-store display, a digital airport display, or the like. Continuing again with the previous example, the presentation module 310 may present the offer provided by the offer module 206 on the user's smart phone display and/or on an in-store display when the user's smart phone comes into a communication proximity with the in-store display. In this manner, the presentation module 310 may present the offer to the user in various locations to reduce the chance that the user will not see the offer.3.

Figure 4:
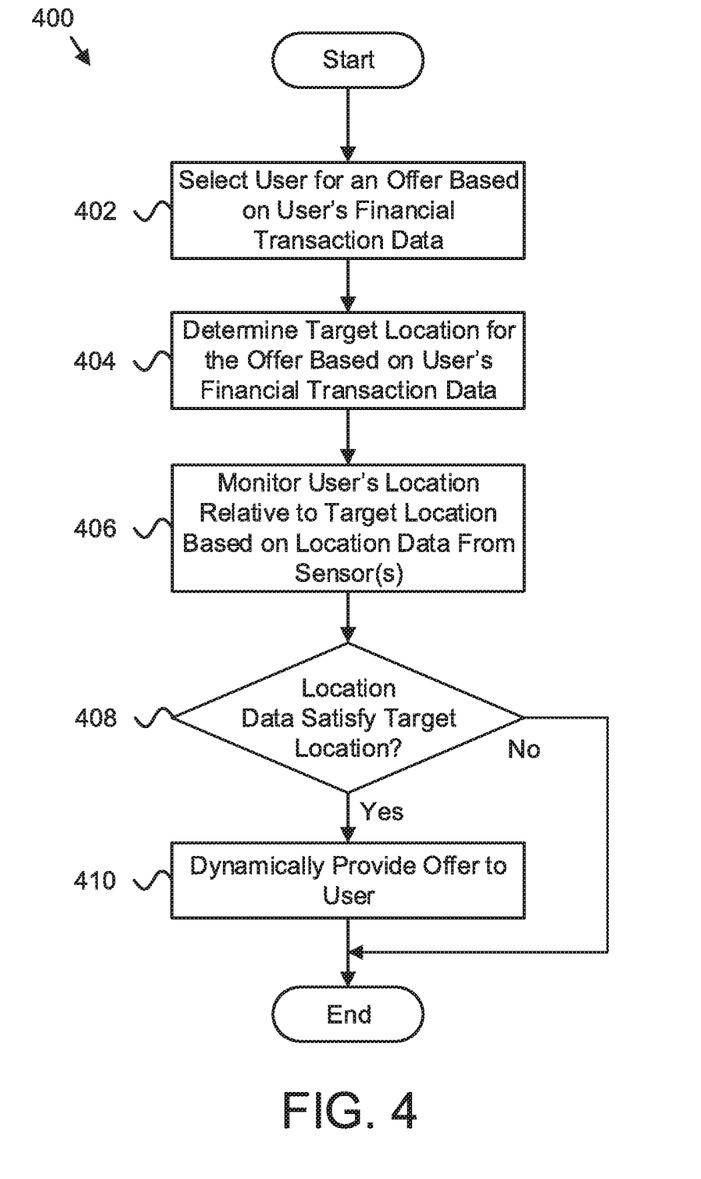
FIG. 4 is a schematic flow chart diagram illustrating one embodiment of a method for presenting content based on transaction history.

FIG. 4 depicts a schematic flow chart diagram of one embodiment of a method 400 for presenting content based on transaction history. In one embodiment, the method 400 begins and the selection module 202 selects 402 a user for an offer in response to the user's financial transaction data satisfying a transaction metric associated with the offer. In a further embodiment, the location module 204 determines 404 a target location for the offer based on the user's financial transaction data. In some embodiments, the location module 204 monitors 406 location data from one or more sensors for the user relative to the target location. In one embodiment, if the location module 204 and/or the offer module 206 determines 408 the monitored location data does not satisfy the target location, the method 400 ends. Otherwise, the offer module 206 dynamically provides 410 the offer to the user in response to the monitored location data from the one or more sensors satisfying the target location, and the method 400 ends.

Figure 5:
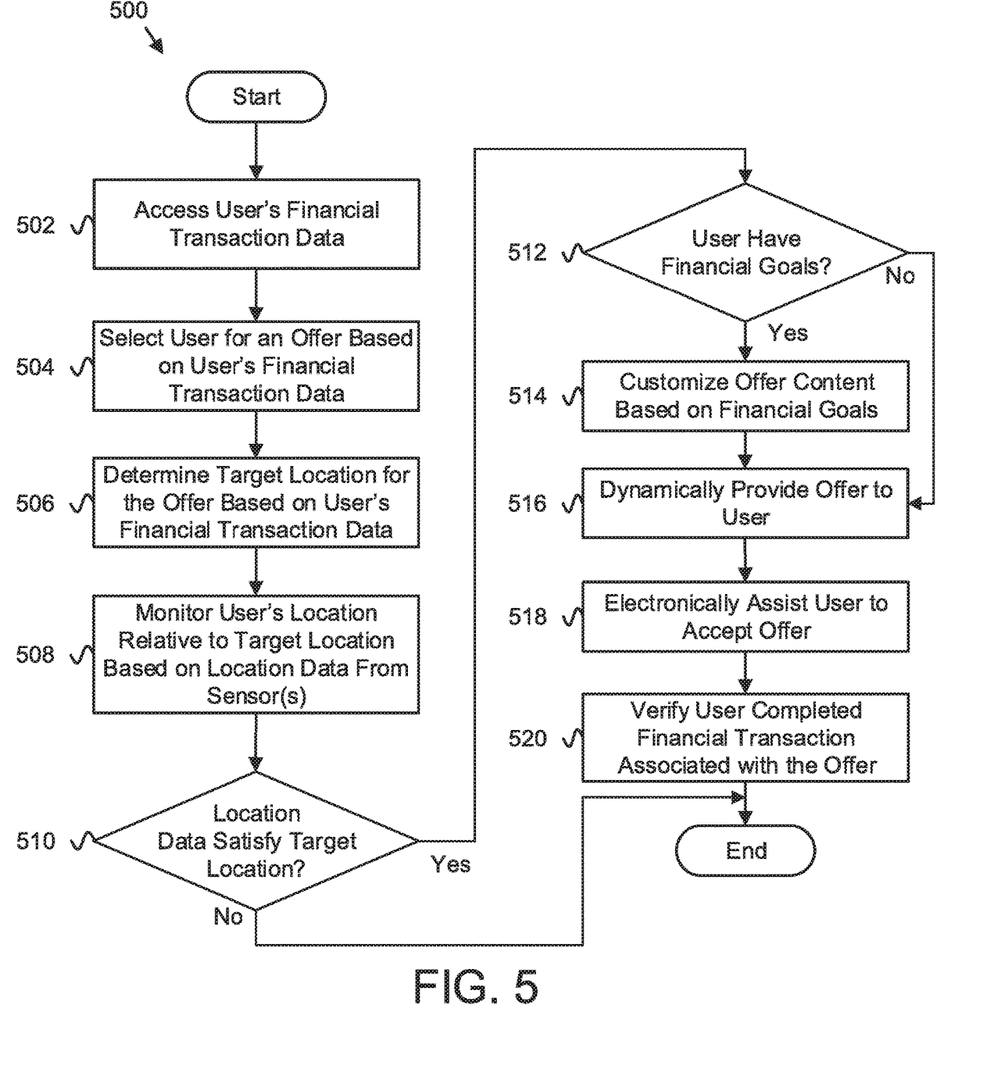
FIG. 5 is a schematic flow chart diagram illustrating one embodiment of another method for presenting content based on transaction history.

FIG. 5 depicts a schematic flow chart diagram of one embodiment of a method 500 for presenting content based on a transaction history. In one embodiment, the method 500 begins, and the transaction module 302 accesses 502 a user's identification and financial transaction data. In certain embodiments, the transaction module 302 accesses the user's identification and financial transaction data from a database of a PFM provider where the data is securely stored such that the data is not available to unauthorized users.

In a further embodiment, the selection module 202 selects 504 a user for an offer in response to the user's financial transaction data, which the transaction module 302 accessed, satisfying a transaction metric associated with the offer. In one embodiment, the location module 204 determines 506 a target location for the offer based on the user's financial transaction data. In some embodiments, the location module 204 monitors 508 location data from one or more sensors for the user relative to the target location. In one embodiment, if the location module 204 and/or the offer module 206 determines 510 the monitored location data does not satisfy the target location, the method 500 ends. Otherwise, the goal module 308, in one embodiment, determines 512 whether the user has established financial goals, budgets, or the like.

If the goal module 308 determines 512 that the user has setup financial goals, which may be based on the user's financial transaction data, the goal module 308 customizes 514 one or more content elements of the offer based on the user's financial goals. Whether the goal module 308 determines 512 the user has financial goals or not, the offer module 206 dynamically provides 516 the offer to the user in response to the monitored location data from the one or more sensors satisfying the target location. In one embodiment, the assistance module 304 electronically assists 518 the user to accept the offer. In certain embodiments, the assistance module 304 electronically assists 518 the user to accept the offer by pre-populating one or more data fields, form fields, or the like with the user's identification and financial transaction data (e.g., billing information, contact information, or the like). In a further embodiment, the verification module 306 verifies 520 the user completed a financial transaction associated with the offer based on subsequent financial transaction data for the user, and the method 500 ends.

Figure 6:
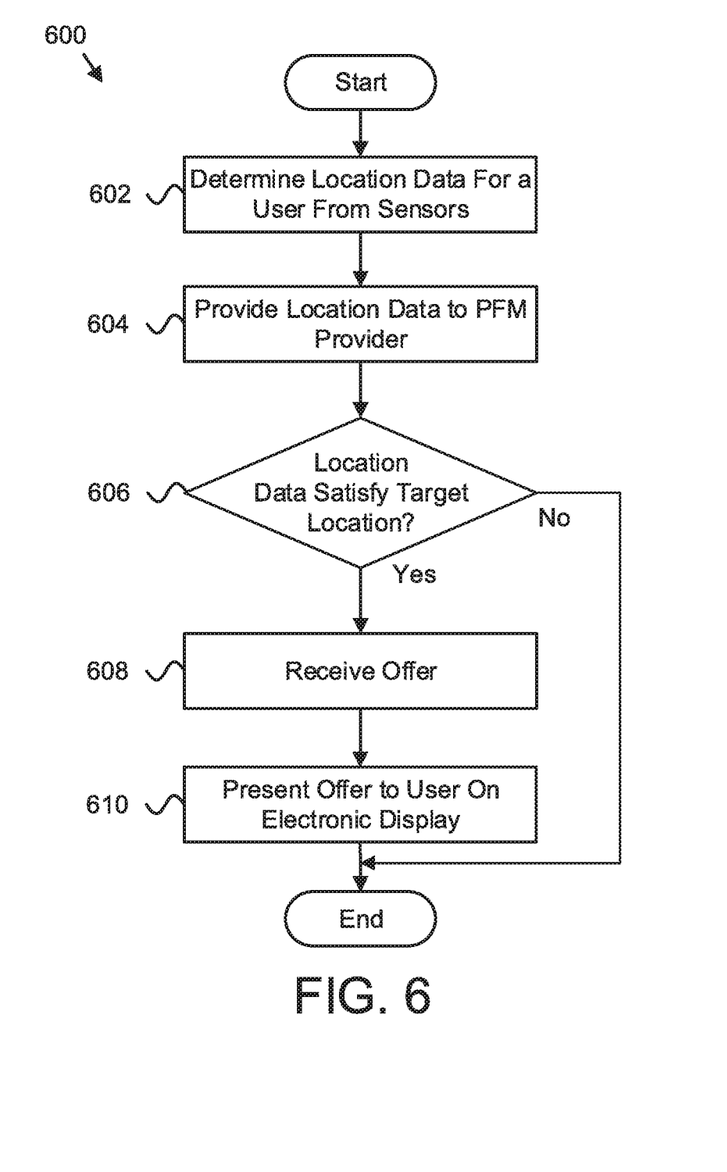
FIG. 6 is a schematic flow chart diagram illustrating an embodiment of a method for presenting content based on transaction history.

FIG. 6 depicts a schematic flow chart diagram of one embodiment of a method 600 for presenting content based on transaction history. In one embodiment, the method 600 begins and the location module 204 determines 602 location data for a user using one or more sensors associated with the user. In a further embodiment, the location module 204 provides 604 the location data to a PFM provider of the user. In certain embodiments, the location module 204 and/or the offer module 206 determines 606 whether the location data satisfies a target location for the offer, which may be determined according to financial transaction data for the user. If the location module 204 and/or the offer module 206 determines 606 that the location data does not satisfy the target location, the method 600 ends. Otherwise, in certain embodiments, the offer module 206 receives 608 an offer for the user. In one embodiment, the presentation module 310 presents 610 the offer to the user on an electronic display associated with the user, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a location module that monitors, from a backend server for a provider of an offer, location data from one or more sensors of a hardware device for a user relative to a plurality of target locations, each target location associated with one or more items for sale;
    a selection module that selects the offer, at the backend server, to finance an item of the one or more items for sale for the user based at least in part on financial transaction data for the user, the selected offer comprising a financing offer for one or more terms of a loan that are more beneficial to the user as compared to corresponding terms of one or more existing loans identified from related financing transactions of the user's financial transaction data;
    an offer module that dynamically provides the offer from the backend server to the hardware device for the user in response to the monitored location data from the one or more sensors satisfying one of the target locations where the user is likely to accept the offer;
    a presentation module that presents the offer from the backend server to the user on an electronic display of the hardware device for the user; and
    a verification module that verifies, at the backend server, that the user completed a financial transaction associated with the offer in response to identifying a payment made to a company offering the loan to finance the item in subsequent financial transaction data for the user that is aggregated from at least one financial account for the user.

2. The apparatus of claim 1, further comprising a mobile application executing on the hardware device of the user, the mobile application comprising computer executable code for one or more of the location module, the selection module, and the offer module.

3. The apparatus of claim 2, wherein the mobile application comprises a personal financial management (PFM) application of a financial institution making the offer to finance the item.

4. The apparatus of claim 2, further comprising a transaction module that accesses the financial transaction data for the user from a financial institution to determine whether one or more transactions from the financial transaction data satisfy a transaction metric associated with the offer.

5. The apparatus of claim 4, further comprising an assistance module that electronically assists the user to accept the offer by pre-populating one or more data fields with identification data for the user and financial information for the user based on the financial transaction data for the user to facilitate acceptance of the offer.

6. The apparatus of claim 1, wherein the one or more sensors comprise one or more of a global positioning system (GPS) sensor, a proximity sensor, and a wireless beacon.

7. The apparatus of claim 1, wherein the offer to finance comprises an offer for a mortgage.

8. The apparatus of claim 7, wherein the offer for a mortgage comprises a mortgage interest rate.

9. The apparatus of claim 8, wherein the mortgage interest rate is selected at least partially based on the financial transaction data for the user.

10. The apparatus of claim 1, wherein the one or more items for sale comprise one or more vehicles.

11. The apparatus of claim 10, wherein the offer to finance comprises an offer for an auto loan and the plurality of target locations comprise one or more auto dealers.

12. An apparatus comprising:
means for monitoring, from a backend server for a provider of an offer, location data from one or more sensors of a hardware device for a user relative to a plurality of target locations, each target location associated with one or more items for sale;
means for selecting the offer, at the backend server, to finance an item of the one or more items for sale for the user based at least in part on financial transaction data for the user, the selected offer comprising a financing offer for one or more terms of a loan that are more beneficial to the user as compared to corresponding terms of one or more existing loans identified from related financing transactions of the user's financial transaction data;
means for dynamically providing the offer from the backend server to the hardware device for the user in response to the monitored location data from the one or more sensors satisfying one of the target locations where the user is likely to accept the offer;
means for presenting the offer from the backend server to the user on an electronic display of the hardware device for the user; and
means for verifying, at the backend server, that the user completed a financial transaction associated with the offer in response to identifying a payment made to a company offering the loan to finance the item in subsequent financial transaction data for the user that is aggregated from at least one financial account for the user.

13. The apparatus of claim 12, further comprising means for electronically assisting the user to accept the offer by pre-populating one or more data fields of the offer with data determined based on the financial transaction data for the user to facilitate acceptance of the offer.

14. The apparatus of claim 12, wherein the one or more sensors comprise a global positioning system (GPS) sensor of the hardware device of the user.

15. The apparatus of claim 12, wherein the one or more sensors comprise a beacon associated with the one of the target locations, the means for monitoring the location data providing the location data to the means for dynamically providing the offer in response to the hardware device of the user coming within a communication proximity of the beacon, the provided offer being associated with the target location.

16. A method comprising:
monitoring, from a backend server for a provider of an offer, location data from one or more sensors of a hardware device for a user relative to a plurality of target locations, each target location associated with one or more items for sale;
selecting the offer, at the backend server, to finance an item of the one or more items for sale for the user based at least in part on financial transaction data for the user, the selected offer comprising a financing offer for one or more terms of a loan that are more beneficial to the user as compared to corresponding terms of one or more existing loans identified from related financing transactions of the user's financial transaction data;
dynamically providing the offer from the backend server to the hardware device for the user in response to the monitored location data from the one or more sensors satisfying one of the target locations where the user is likely to accept the offer;
presenting the offer from the backend server to the user on an electronic display of the hardware device for the user; and
verifying, at the backend server, that the user completed a financial transaction associated with the offer in response to identifying a payment made to a company offering the loan to finance the item in subsequent financial transaction data for the user that is aggregated from at least one financial account for the user.

17. The method of claim 16, further comprising:
accessing the financial transaction data for the user from a financial institution for the user, the financial institution providing the offer to finance the item; and
determine whether one or more transactions from the financial transaction data satisfy a transaction metric associated with the offer, wherein dynamically providing the offer is in response to the one or more transactions satisfying the transaction metric.

18. The method of claim 16, further comprising electronically assisting the user to accept the offer by pre-populating one or more data fields with identification data for the user and financial information for the user based on the financial transaction data for the user to facilitate acceptance of the offer.

* * * * *